United States Patent [19]
Sudyk

[11] 3,763,595
[45] Oct. 9, 1973

[54] SEAL FOR HATCH COVER OR THE LIKE

[75] Inventor: John R. Sudyk, Huntsburg, Ohio

[73] Assignee: The Johnson Rubber Company, Middlefield, Ohio

[22] Filed: Sept. 7, 1972

[21] Appl. No.: 286,877

[52] U.S. Cl.................... 49/485, 49/489, 49/498
[51] Int. Cl.............................................. E06b 7/23
[58] Field of Search.................. 49/489, 490, 498, 49/497, 475, 488, 485; 160/188

[56] References Cited
UNITED STATES PATENTS

| 2,622,286 | 12/1952 | Beck | 49/498 X |
| 2,705,655 | 4/1955 | Brown et al. | 49/498 X |
| 2,899,721 | 8/1959 | Herman | 49/497 |
| 3,104,643 | 9/1963 | Vallet | 160/188 X |

FOREIGN PATENTS OR APPLICATIONS

| 822,157 | 11/1951 | Germany | 49/498 |
| 1,509,167 | 12/1968 | Germany | 49/489 |

Primary Examiner—Mervin Stein
Assistant Examiner—Philip C. Kannan
Attorney—Harold F. McNenny et al.

[57] ABSTRACT

An elastomeric seal is disclosed which is particularly suited for forming a fluid-tight seal between a closure member and a structure extending around the opening to be closed such as the seal required between marine hatch cover and hatchway. The seal includes a generally U-shaped base section which supports a seal section. The seal section includes a bridging wall and a sealing wall supported by the bridging wall by spaced side legs and a center leg. Compression of the seal causes bowing of the bridging wall into the U-shaped base section and collapse of the side walls of the seal section. A resilient bumper is provided on the base wall to engage the bridging wall to maintain the level of compression force resisting further compression. As the seal is initially compressed, the compression force required builds rapidly to insure a proper seal with small seal compression. The seal is compressible through an additional substantial range without greatly increasing the required force of compression. Therefore, a proper seal is obtained through substantial ranges of seal compression without encountering excessive compressive forces.

13 Claims, 5 Drawing Figures

Patented Oct. 9, 1973

3,763,595

SEAL FOR HATCH COVER OR THE LIKE

BACKGROUND OF THE INVENTION

This invention relates generally to elastomeric seals and more particularly to a novel and improved elastomeric seal suitable for use in providing a seal between a marine hatch cover and coaming or the like.

PRIOR ART

Elastomeric seals are used in many instances to provide a fluid-tight joint between openings and a closure member. For example, such seals are often mounted on a marine hatch cover and arranged to form a fluid-tight seal with the coaming which extends around the hatchway when the cover is in place.

SUMMARY OF THE INVENTION

The preferred seal incorporating this invention is arranged so that it is deformable or compressible under relatively low pressure loads through a substantial range of compression. However, the structure provides sufficient resistance to even small amounts of compression to insure proper sealing. The ability to provide a seal over a wide range of degrees of compression in such installation without requiring excessive compression forces is important in hatch cover seals because hatch covers and the coaming around the hatchways are not perfectly straight or perfectly aligned with the result that the seal may be compressed more in one zone than in another zone. Further, the working of the vessel may cause some changes in the degree of seal compression while the vessel is underway.

A seal in accordance with the present invention is preferably provided with a unitary body of extruded elastomeric material. The body includes a generally U-shaped base section adapted to fit into and be carried by a metal U-shaped channel secured to a hatch cover or the like. Such U-shaped base section includes a base wall and a pair of base legs extending from opposite sides of the base wall.

The seal body is also provided with a seal section carried by the base section which includes a bridging wall extending across and supported by the base legs in a position spaced from the base wall and substantially parallel thereto. The seal section also includes a seal wall spaced from and substantially parallel to the bridging wall which is supported by the bridging wall by a pair of outside legs and a center leg.

The structure is arranged so that upon intial compression of the seal, created by movement of the seal wall toward the base wall, the two side legs buckle inwardly and the bridging wall is bowed inwardly toward the base wall by the center wall. Continued compression of the seal through a substantial range of compression causes further buckling of the side walls and further bowing of the bridging wall until the side of the bridging wall opposite the center leg engages a resilient bumper section provided on the base wall. This bumper functions to maintain the resistance of the seal to compression at a point in the compression in which the buckling of the side leg and the bowing of the bridging wall tends to reduce the force required for further compression.

With this seal structure, the seal produces a reaction force upon compression which builds rapidly as the seal is compressed and then is maintained at a substantially constant value through a substantial range of compression. Therefore, a proper sealing pressure having a substantially constant value is achieved with a relatively small amount of seal compression and is maintained for proper sealing through a substantial range of compression so that excessive compression forces are not required.

In the illustrated embodiment, the base section is also provided with diagonal walls extending from adjacent the center portion of the base wall to the ends of the base legs which tend to hold the base section against collapse and tend to insure that the collapsing or compressing movement occurs primarily in the seal section. Further, the side legs are provided with hinge sections of reduced thickness to facilitate the buckling movement of the side legs and to insure that such legs collapse inwardly. The resilient bumper in the illustrated embodiment is provided by a semi-cylindrical wall extending from the center portion of the base wall on the side of the bridging wall opposite the center wall.

DETAILED DESCRIPTION OF THE DRAWINGS

Figure 1:
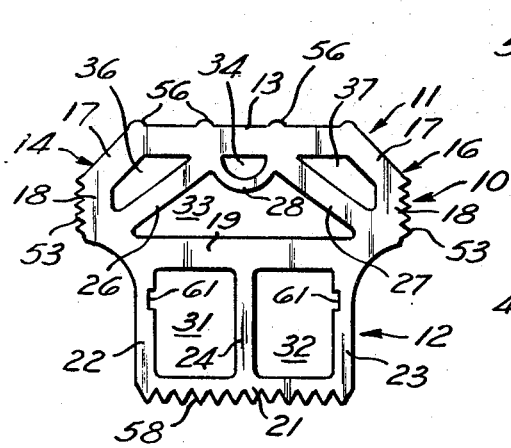
FIG. 1 is an end view of a preferred form of seal in accordance with the present invention illustrating the seal in the completely unstressed condition.

Referring to the drawings, the seal in its unstressed condition is illustrated in FIG. 1. The seal is preferably formed of extruded elastomeric material having a one-piece homogenous body 10. The seal includes a generally U-shaped base section 11 and a seal section 12. The base section includes a base wall 13 and a pair of laterally extending base legs 14 and 16. In the illustrated embodiment, the base legs 14 and 16 include a diagonal section 17 which joins with the adjacent edge of the base wall and extends to side sections 18 both of which extend substantially perpendicular to the base wall.

The seal section 12 includes a bridging wall 19 supported at its edges by the legs 14 and 16 and extending substantially parallel to the base wall 13. The seal section also includes a seal wall 21 which is substantially parallel to the base wall 13 and is supported from the bridging wall by a pair of side legs 22 and 23 and a central leg 24. In the unstressed condition, the legs 22 through 24 are all substantially parallel to each other and the legs 22 and 23 are spaced from each other by a distance less than the spacing between the side sections 18 of the base legs 14 and 16.

The base section 11 is also provided with diagonal walls 26 and 27 which extend from the base wall 13 adjacent to its center to the base legs 14 and 16 adjacent the bridging wall 19. These diagonal walls 26 and 27 support the legs 14 and 16 and resist collapse of the base section during compression of the seal.

The base wall 13 is also provided with a bumper 28 provided by a semicylindrical wall having a thickness less than the thickness of the base wall and projecting from the base wall toward the bridging wall on the side thereof opposite the central leg 24. The various walls of the seal enclose openings which allow the seal to compress as described below. Two rectangular openings 31 and 32 are provided in the seal section 12 and are defined by the legs 22 through 24 in combination with the bridging wall 19 and the seal wall 21. The bridging wall 19 cooperates with the diagonal walls 26 and 27 and the bumper 28 to enclose an opening 33 within the base section. A smaller opening 34 is enclosed by the base wall 13 and the bumper 28. Side openings 36 and 37 are enclosed by the base wall 13 and the associated base legs 14 and 17 and diagonal walls 26 and 27.

Figure 2:
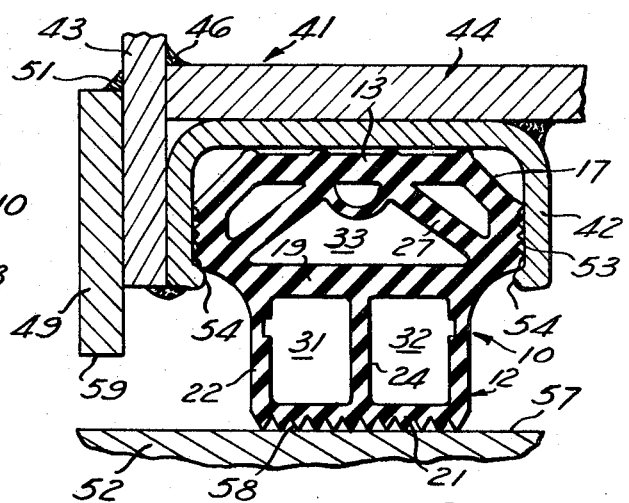
FIG. 2 is a fragmentary section illustrating the seal of FIG. 1 mounted in a U-shaped channel on a hatch cover with the seal wall engaging the coaming, but before compression of the seal.
Figure 3:
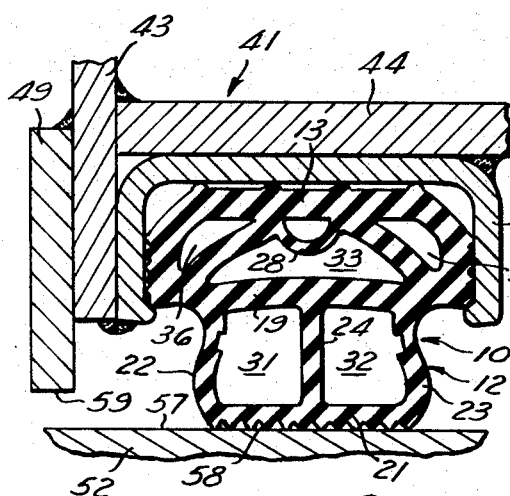
FIG. 3 is a view similar to FIG. 2 illustrating the seal partially compressed by movement of the hatch cover toward the coaming.
Figure 4:
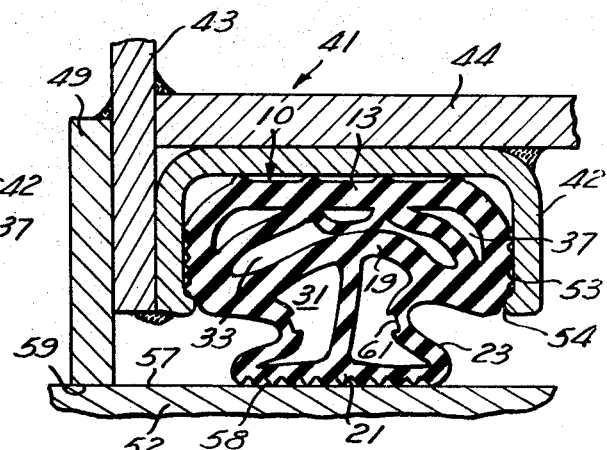
FIG. 4 is a fragmentary view similar to FIGS. 2 and 3 but illustrating the seal in a fully compressed condition in which further compression of the seal is limited by engagement of a stop carried by the hatch cover with the coaming.

Referring to FIGS. 2 through 4, the seal is preferably mounted on a hatch cover 41 within a U-shaped metal channel 42 mounted on the hatch cover. The particular structure of the hatch cover forms no part of this invention but would normally include a side plate 43 and a horizontal plate 44 welded at 46 to the side plate 43. A stop plate 49 is welded to the side plate 43 at 51 and serves to engage the coaming 52 around the hatchway to support the weight of the hatch cover on the coaming and limit the degree of compression of the seal.

The channel 42 is proportioned to laterally compress the side sections 18 of the base legs 14 and 16 to a sufficient degree to insure that saw-toothed projections 53 formed in the sections 18 provide a fluid-tight joint between the base section 11 and the channel 43. Preferably, the channel is provided with inturned projections 54 to assist in retaining the seal in place. In the illustrated embodiment, the base wall is also provided with protrusions 56 which engage the channel 42 to provide additional points of increased contact pressure to insure that a fluid-tight joint is achieved. If desirable, the mounting of the seal within the channel 42 can be further strengthened by the use of suitable adhesives.

The coaming 52 provides a flat coaming surface 57 which is engaged by saw-toothed type projections 58 formed on the lower surface of the seal wall 21 as the hatch cover moves toward the coaming 52. Here again, the saw-toothed projections 58 improve the seal provided with the surface 57 by forming spaced locations of substantial contact pressure.

FIG. 2 illustrates the structure when contact is obtained between the seal wall 21 and the coaming surface 57 but before compression of the seal. In this position, the lower edge 59 of the stop 49 is spaced from the coaming surface.

As the hatch cover continues to move toward the coaming, a condition is reached as illustrated in FIG. 3 in which the seal is partially compressed. At this point in the compression of the seal, the bridging wall 19 is bowed up toward the base wall 13 but is still spaced from the bumper 28. The center leg 24 remains substantially straight in this condition and causes the bowing action of the bridging wall 19. However, the side legs 22 and 23 have started to buckle and the diagonal walls 26 and 27 are bent to a slight degree. In the preferred embodiment, the side legs 22 and 23 are provided with hinged sections 61 of reduced thickness to facilitate the buckling of the sidewalls as the seal is compressed.

As the hatch cover continues to move toward the coaming to the fully compressed position of FIG. 4, further compression of the seal occurs, and the edge 59 of the stop plate 49 moves into engagement with the coaming surface 57 to limit further compression of the seal. When the position of FIG. 4 is reached, the bridging wall 19 is bowed an additional substantial amount and is in engagement with the bumper 28. Also, the side legs 22 and 23 are buckled until they are almost folded at the hinged section 61. Further, a substantial bend exists in the diagonal walls 26 and 27. In this condition, however, the center leg 24 is still substantially straight. The bumper 28 by its engagement with the bridging section 19 functions to provide a spring means to resist further compression of the seal at a point when some compression force loss could occur due to collapse of the side legs 22 and 23.

Figure 5:
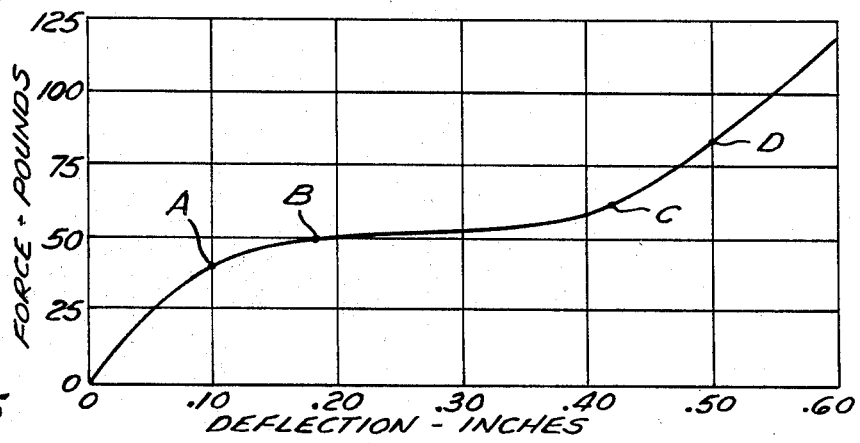
FIG. 5 is a force distance curve illustrating the reaction force resisting compression of the seal for various degreees of seal compression.

FIG. 5 is a graph in which force of compression per unit of seal length is plotted against deflection or seal compression for a typical seal form as illustrated of elastomeric material such as styrene butadine rubber with a durometer of about 55 on the Shore A scale. Of course, other elastomers may be used to form the seal. As the compression of the seal is initiated, the force of compression climbs rapidly along the curve to a point about at A. This insures a good sealing contact between the sealing wall 21 and the coaming surface 57 even when substantial seal compressions are not achieved. Continued compression to a deflection to the point B causes the compression force to increase at a lesser rate. Further compression of the seal beyond the deflection indicated at B does not create any substantial increase in the force of compression until the seal is deflected a substantially greater amount to about the point C. Therefore, proper sealing is obtained wtih a very small seal compression but the seal is compressible through a substantial range from about the point A to the point C without encountering excessive compression forces. The stop 49 is located with respect to the seal so that further compression of the seal is prevented before excessive compression of the seal occurs. In the illustrated embodiment, the stop 49 engages the coaming at least by the time the compression reaches the point D on the curve of FIG. 5.

Although a preferred embodiment of this invention is illustrated, it is to be understood that various modifications and rearrangements of parts may be resorted to without departing from the scope of the invention disclosed and claimed herein.

What is claimed is:

1. A seal comprising an elongated unitary body of elastomeric material, said body including a generally U-shaped base section and a seal section, said base section including a base wall and a pair of legs extending from the sides of said base wall, said seal section including a bridging wall substantially parallel to said base wall supported at its edges by said base legs and a seal wall substantially parallel to and spaced from said bridging wall, said seal wall being supported by said bridging wall by a pair of side legs and a central leg, and a resilient bumper formed on said body between said base wall and bridging wall, initial compression of said seal causing movement of said seal wall toward said base wall causing buckling of said side legs and bowing of said bridging wall without deformation of said bumper, continued compression causing further buckling of said side legs and continued bowing of said bridging wall until the bumper is engaged and deformed to resist further compression, said seal resisting compression with a force which builds rapidly and thereafter increases at a slower rate through a substantial range of compression.

2. A seal as set forth in claim 1 wherein said bumper is formed on said base wall and is engaged by the side of said bridging wall opposite said central leg.

3. A seal as set forth in claim 2 wherein said bumper is formed by a wall projecting from said base wall which cooperates therewith to define an opening.

4. A seal as set forth in claim 3 wherein said bumper is formed by a semi-cylindrical wall.

5. A seal as set forth in claim 4 wherein said base is provided with diagonal walls joining said base wall and said base legs adjacent to said bridging wall.

6. A seal as set forth in claim 5 wherein said side legs are spaced apart by a distance less than the spacing between said base leg.

7. A seal as set forth in claim 6 wherein said side legs are formed with hinge sections of reduced thickness and said side legs buckling inwardly.

8. A seal as set forth in claim 7 wherein said slower rate results in a substantially constant force of compression through said substantial range of compression.

9. A seal as set forth in claim 8 wherein said seal is mounted on a first member to form a seal with a surface provided by a second member, said members being movable toward each other to cause engagement between said seal wall and said surface and subsequent compression of said seal, and stop means limit movement of said members toward each other to limit the compression of said seal.

10. A seal as set forth in claim 9 wherein said members are provided by a marine hatchway and a cooperating hatch cover.

11. A seal as set forth in claim 1 wherein said bumper is formed by a semicylindrical wall formed between said base wall or said bridging wall and cooperating with one of them to form an opening.

12. A seal as set forth in claim 1 wherein said base is provided with diagonal walls joining said base wall and said base legs adjacent to said bridging wall.

13. A seal as set forth in claim 1 wherein said side legs are formed with hinge sections of reduced thickness and said side legs buckle inwardly.

* * * * *